Dec. 21, 1965    V. L. ROGALLO    3,224,263
NULL-TYPE VACUUM MICROBALANCE
Filed Nov. 9, 1962    4 Sheets-Sheet 1

INVENTOR.
VERNON L. ROGALLO

Dec. 21, 1965 V. L. ROGALLO 3,224,263
NULL-TYPE VACUUM MICROBALANCE
Filed Nov. 9, 1962 4 Sheets-Sheet 2

INVENTOR.
VERNON L. ROGALLO
BY

Dec. 21, 1965    V. L. ROGALLO    3,224,263
NULL-TYPE VACUUM MICROBALANCE
Filed Nov. 9, 1962    4 Sheets-Sheet 3
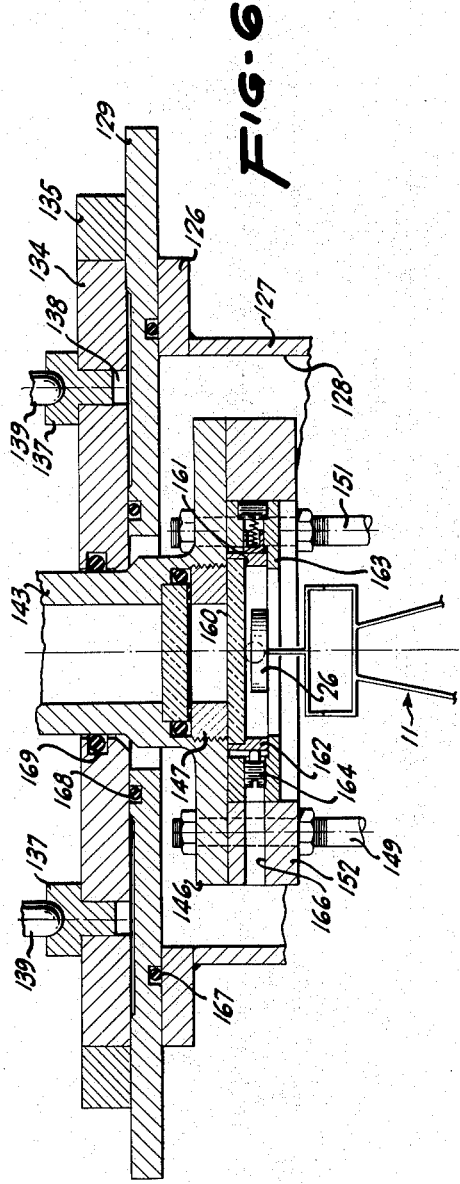
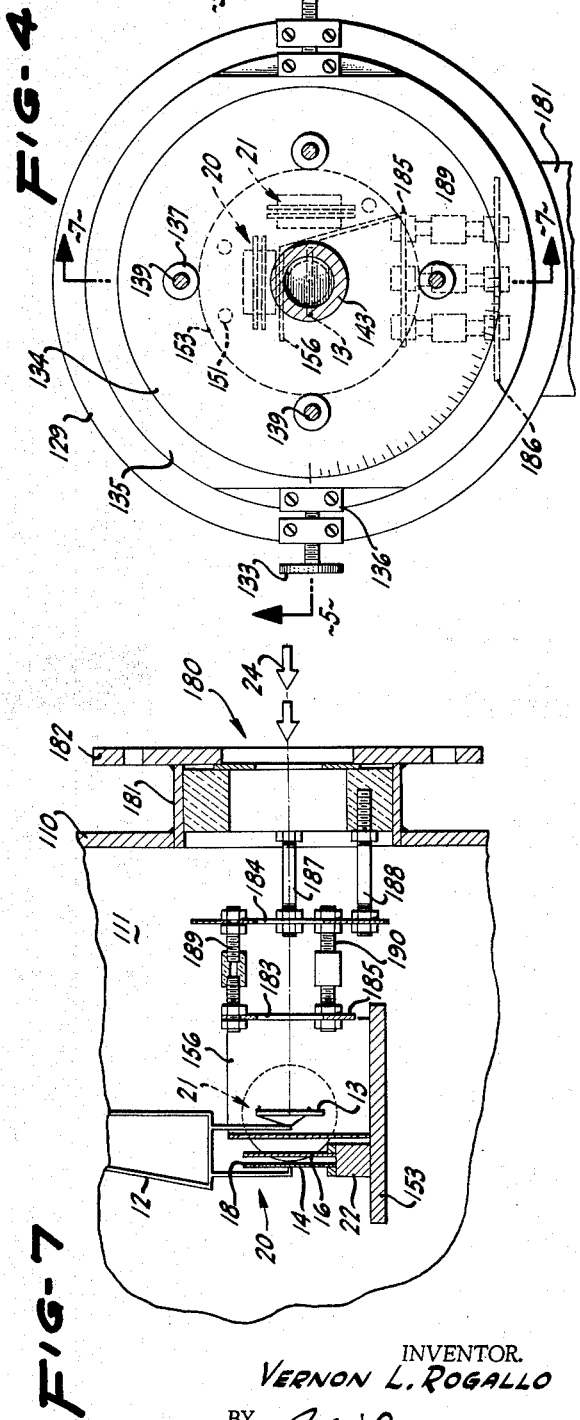
INVENTOR.
VERNON L. ROGALLO
BY Dec. 21, 1965          V. L. ROGALLO          3,224,263
NULL-TYPE VACUUM MICROBALANCE
Filed Nov. 9, 1962                4 Sheets-Sheet 4

INVENTOR.
VERNON L. ROGALLO
BY

United States Patent Office  3,224,263
Patented Dec. 21, 1965

3,224,263
NULL-TYPE VACUUM MICROBALANCE
Vernon L. Rogallo, Los Altos, Calif., assignor to the United States of America as represented by the Administrator of the National Aeronautics and Space Administration
Filed Nov. 9, 1962, Ser. No. 236,749
11 Claims. (Cl. 73—142)
(Granted under Title 35, U.S. Code (1952), sec. 266)

The invention described herein may be manufactured and used by and for the United States of America for governmental purposes without the payment of any royalties thereon or therefor.

This invention relates to a null-type vacuum microbalance to be used for detecting and measuring minute mechanical displacements, and, in particular, to a microbalance employing a compound pendulum for measuring at least two components of force.

There are numerous microbalances and other mesuring apparatus for measuring minute forces in the art, and it is interesting to note that there are many different and varied mechanisms for accomplishing the desired purposes. However, it must be recognized that such prior art mechanisms are by no means as efficient in construction or operation as might be desired, and, for this reason, one object of this invention is to approach the problem from a new direction and to provide a novel pendulum-type microbalance, which, not only avoids the deficiencies of prior art balances, but is also capable of more accurate measurement, and is capable of measuring forces along two coordinates.

In the measurement of small corpuscular or ionic beams, it is often desirable to use a measuring instrument or balance, which can be operated without calibration, and which is completely free of moving parts, such as pivots, bearings, knife edges or the like, the movements of which will cause wear and fatigue and will introduce sources of error into the balance. A high degree of sensitivity should be provided for measuring minute forces, such as ion-beam reaction forces, which are in the order of 1–500 micrograms at room temperatures, and the sensitivity should be adjustable to allow greater versatility in handling various magnitudes of forces. Any measurements should also be independent of fluctuations in the various operating pressures, and the balance should therefore be capable of operating in an extremely high vacuum, or even under atmospheric conditions if necessary. In addition, continual calibration shoul be eliminated, it being preferable that a single initial calibration suffice for a prolonged period of use. However, there is no known microbalance employing a pendulum-type action as disclosed by this invention.

Thus, it is an object of the present invention to provide a microbalance with a variable sensitivity, which can be operated without repeated calibration, but yet, at the same itme, has an extended range of sensitivity, thereby providing for the measurement of extremely small forces or relatively large forces by quick adjustments of the balance.

It is another object of the present invention to provide a microbalance employing a pendulum-type action, which operates independently of parts having more than a negligible amount of frictional resistance.

It is another object of this invention to provide a microbalance which is independent of temperature or pressures, and which can be operated at room temperatures under varying pressure conditions, ranging from extremely high vacuums to above atmospheric pressures.

It is a further object of this invention to provide an improved microbalance capable of measuring component forces of the original force to be measured.

The present invention is expressly designed for the componental measurement of minute ion-beam reaction forces at low pressures, but is not intended to be limited to the measurement of such forces alone. This measurement is accomplished by employing a pendulum-type balance, which is deflected by the applied force. For example, an ion-beam may be focused upon the target portion of the pendulum balance, impacting therewith and causing the pendulum to swing away from its original null or stable, rest position. The balance is then brought back to the null position by two electrostatic force vectors induced in two directions, both of which, when added together, give a resultant force vector equal to and opposite to the impinging beam. When the pendulum is back to the original null position, the force required to create the electrostatic forces involved may be directly read as a function of voltage to measure the force of the impinging ion beam. Thus, the balance is essentially a compound pendulum mounted on a single suspension unit, which is suspended by a fine wire flecture to eliminate wearing pivot points, bearings or knife edges. The suspension unit acts as the pendulum and is initially brought to rest in its null position by lining up reference marks thereon with a similar set of reference marks on a fixed reference system, which, for example, may be an optical system. Additional initial balancing is obtained by adjusting counterweights and observing the position of the suspension unit with respect to the two aforementioned reference points. When the initial reference point is obtained, no further calibration is required and the balance is ready for operation.

The suspension unit may be returned to its original null position by manually adjusting the two returning electrostatic forces. However, if manual operation is not desired, automatic servomechanism may be employed to automatically return the balance to the null position.

Means are also provided for adding or removing weight for shifting the vertical center of mass in the balance herein, and thereby adjusting the sensitivity of this invention by varying the effective moment of force that the measured ion beam must overcome.

In addition, because of its construction, the pendulum is counterbalanced with an almost equal moment arm and temperature expansions or contractions will thus have negligible effect upon the arms thereof, since each arm expands or contracts the same amount. In this sense, the balance is self-compensating, and its accuracy will be unaffected by the variations in temperature. Furthermore, the absence of any moving parts, pivots or bearings increases the useful life of this invention, eliminates other sources of error and provides a very simple, less expensive microbalance with a higher degree of sensitivity than heretofore available.

Other advantages of this invention will become apparent from the following detailed description and the accompanying drawings, showing one preferred embodiment of the present invention.

FIGURE 4 is a plan view of the microscope and housing of the present invention;

FIGURE 6 is an enlarged fragmentary view taken in the plane 6—6 of FIGURE 5; and FIGURE 7 is a fragmentary cross-section, showing the target and its related electrostatic unit and showing an ion-beam focusing device, said figure being taken in the plane 7—7 of FIGURE 4.

Figure 1:
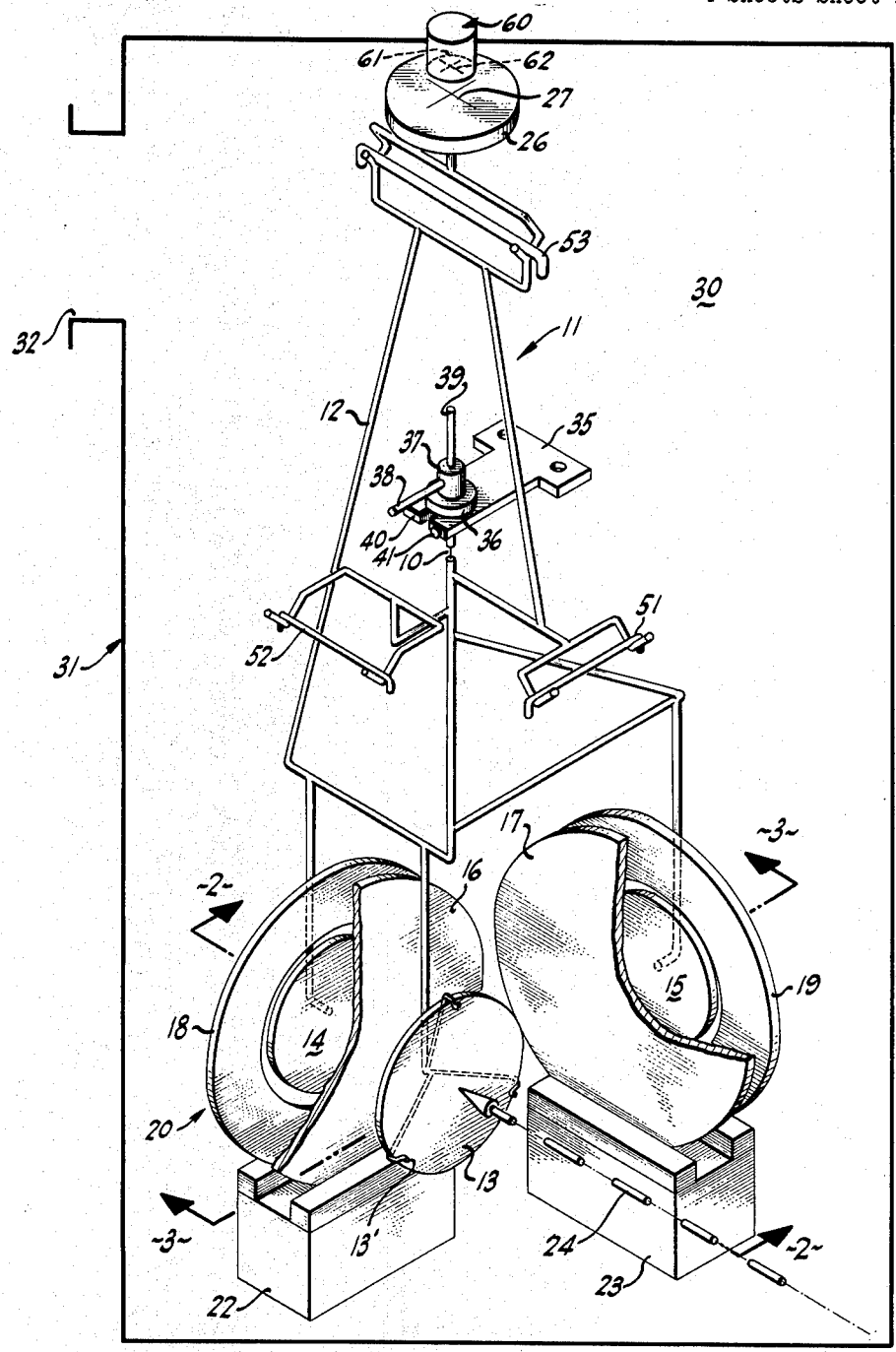
FIGURE 1 shows a three dimensional view of the suspension unit, embodying the pendulum principles of this invention.

Referring now to FIGURE 1, it will be seen that in one preferred embodiment of the present invention a fine wire flexure 10 supports a suspension unit 11, which essentially is a compound pendulum. The unit 11 comprises a structurally variegated, lattice framework 12, from which a target 13 and two annular, movable discs 14 and 15 are rigidly suspended with their respective faces being perpendicular to each other, as shown.

The framework 12 is preferably made of thin, rod-like material, and for this reason the material should have sufficient rigidity to prevent distortion of the framework 12 and prevent internal vibration, both of which affect the balance. On the other hand, the material must also be a good conductor of electricity because part of the electrical circuitry, which will be described in detail herein, will be comprised of flexure 10 and framework 12. For example, in one working model of this invention a finely drawn quartz wire of approximately 50 millimeters diameter and fused quartz rods were used to construct flexure 10 and framework 12, respectively. A gold coating was applied to give the desired conducting property to the relatively temperature-stable, rigidly-constructed structure so created. The discs 14 and 15 may also be constructed of gold coated quartz. On the other hand, target 13, which is suspended from framework 12 by spring clips 13', preferably made of spring metal, must withstand the bombardment of high energy particles, and, hence, is preferably made of material adapted to withstand the bombardment energy of the particular particles being measured.

The movable discs 14 and 15 and the stationary discs 16 and 17, together with ring guards 18 and 19, form two electrostatic units 20 and 21, respectively, which are rigidly mounted on support blocks 22 and 23. These two electrostatic units are employed to measure the perpendicular components of any force 24 (indicated by the arrow) striking and deflecting target 13. The framework 12 and the movable discs 14 and 15 are maintained at a different potential than stationary discs 16 and 17. The movable discs 14 and 15 are preferably held at ground potential. After the force 24 is impacted against the target 13, the pendulum is brought back to the null position by raising the potential of the stationary discs 16 and 17 and causing the two movable discs to return to their original position by electrostatic attraction. It should be noted that the electric field between the movable discs 14 and 15 and the stationary discs 16 and 17 will be uniform and free from fringe effects which might otherwise be present because ring guards 18 and 19 circumscribe smaller moving discs, as shown, and are maintained at the same potential as the moving discs. Hence, the electric field vectors, between the moving discs and the stationary discs will be of the same value as the electric field vectors between the ring guards and the stationary discs with substantially no variation in direction or magnitude across the circular space between the moving discs and the ring guards.

In order to decrease the total moment of force which must be overcome by the impacting ion beam 24, a counterweight 26 is attached to the framework 12 and is provided with a cross-haired reticle 27, inscribed in the top thereof. This counterweight 26 must be sufficiently small to maintain the vertical center of gravity below the point of suspension, since the pendulum will become unstable if the vertical center of gravity is raised above this point. It should be noted that the relative position of counterweight 26 and the moving discs 14 and 15 may be reversed by placing the counterweight 26 on the lower part of framework 12 and placing the discs at the top, with the stationary discs positioned accordingly. However, in principle such an embodiment is equivalent to the preferred embodiment described herein.

Before considering the apparatus of FIGURE 1 in greater detail, the operation is briefly outlined in order to provide an understanding of the principles of this invention. This balance may be employed to measure any type of deflecting force, but, by way of illustration and not by way of limitation, ion-beam reaction forces will be referred to as an example of the force to be measured. When the ion-beam force 24 strikes target 13 the horizontal force vector of the beam may be resolved into two vectors which are perpendicular to the faces of the respective movable discs 14 and 15, and to each other. These component forces displace the movable discs 14 and 15, and cause the framework 12 to swing about its pivot point at the top of the suspension flexure 10. The movement is indicated by the displacement of reticle 27, and electrostatic forces are applied to plates 14 and 15 to bring the pendulum-like suspension unit 11 back into its stable, null position.

Referring now in more detail to the particular parts embodying the present invention, it should be noted that whatever be the nature of the atmosphere surrounding the electrostatic units 20 and 21, the movable discs 14 and 15 are surrounded by the same atmosphere, and no pressure differential exists on either side of said discs to affect the accuracy of the pendulum action of this balance. Hence, this invention may be used to measure forces under ordinary atmospheric conditions and even under greater pressure conditions. However, when measuring minute forces, for example ion-beam reaction forces or radiation forces, it is preferable to operate the present invention in a vacuum to eliminate the damping effect of the gaseous medium, which would be extremely pronounced because of the relatively wide area of the movable discs. Furthermore, in measuring charged ion beams, for example, the existence of gaseous molecules would impede the beam 24 and introduce a large source of error in the measurement of said beam. The invention is housed within an evacuable cavity or chamber 30, defined by structure 31, which is provided with an opening 32, leading to a conventional vacuum pump, not shown. The pressure maintained within vacuum chamber 30 is quite low. For example, in measuring ion-beam reaction forces, in the order of 1–500 micrograms, an absolute pressure of $10^{-6}$ millimeters of Hg is maintained.

Within the vacuum chamber 30, a supporting plate 35, preferably made of Lucite, is rigidly connected to the walls of structure 31. This plate supports a small, annular washer 36, which serves as a supporting shoulder for the suspension unit 11. This washer 36 supports a smaller, cylindrical collar 37 with an angular adjustment arm 38 rigidly connected thereto, as shown in the drawings. This angular adjustment arm 38 is employed to turn the entire suspension unit 11 about a vertical axis through flexure 10, for aligning the moving disc with the stationary discs. A vertical adjustment rod 39 moves up and down within a hole provided within the small, cylindrical collar 37 and is connected at its lower end to the suspension flexure 10. This suspension flexure is preferably made very small, and is preferably formed of a substance which will offer a minimal amount of mechanical resistance to the pendulum motion, for reducing unwanted restoring forces. For example, as mentioned above, making the suspension flexure 10 of finely drawn quartz wire of approximately 50 microns diameter provides the desired characteristics. The vertical adjustment rod 39 is held within the supporting plate 35 by a spring clip 40, which is secured to the supporting plate 35 by a screw 41, as shown, and the rod 39 is also securely held within the small, cylindrical collar 37 by a small set screw (not shown) recessed within said collar 37. The vertical adjustment rod 39 may be moved vertically and, because it is connected to the suspension unit 11 through the suspension flexure 10, it may be used to adjust the vertical spacing between the moving discs 14 and 15 and their respective ring guards 18 and 19. Thus, the moving discs 14 and 15 may be initially positioned for alignment with the stationary discs 16 and 17, respectively, by turning the angular adjustment arm 38 and raising or lowering the vertical adjustment rod 39. It should be noted that the moving discs and the stationary discs, in forming the plates of the capacitors herein, should preferably have a flat, smooth surface so that the capacitors formed thereby will be free of surface irregularities, which would vary their capacitive properties and introduce unwanted errors into the measuring mechanism.

The framework 12 may be of any varied configuration providing a proper supporting structure for the movable discs 14 and 15 and it may be generally described as a lattice framework, preferably made of fused quartz rods, fused together at various intersections to provide a geometrical configuration, properly designed to hold the center of gravity of the suspension unit in a vertical line with the suspension flexure 10 when the framework 12 is properly balanced at its null position. The vertical adjustment rod 39, the angular adjustment arm 38, the cylindrical support collar 37, the support washer 36, the stationary discs 16 and 17, the ring guards 18 and 19 are also preferably made of fused quartz and when connected to the electrostatic balancing circuit, which will be described in greater detail later, must also transmit electricity. Therefore, all these parts are preferably coated with a good conducting material. For example, they all may be coated with gold.

This suspension unit 11 forms the pendulum of this invention and must be balanced at a null position. For this purpose, two lateral balancing adjustment weights 51 and 52 are provided and placed upon framework 12 in the manner depicted in FIGURE 1. Weight 51 is a removable lateral adjustment weight, which, for example, may weigh approximately 2 grams. This weight is used for balancing the torque produced by the moment of force resulting from the weight of the moving disc 14 and the target 13 at their offset positions about the center of mass of the pendulum. Likewise, weight 52 is a lateral adjustment weight used to compensate for the moment of force about the center of mass of the pendulum created by the weight and displacement of movable disc 15.

Since this invention employs the principles of a pendulum, it should be noted that by changing the position of the vertical center of mass with respect to the pivot point for the pendulum, the moment of force necessary for the impacting beam 24 to overcome may be changed. Thus, a sensitivity adjustment weight 53 for changing the position of the vertical center of mass is employed to provide variable sensitivity. For example, if the center of mass is at enclosed cross 55, as shown, in FIG. 5, by adding more mass in the form of a heavier weight 53 the position of the center of mass will be moved upward. This lift in the center of gravity will decrease effective moment of force, which ion beam 24 must overcome, and will lengthen the period of oscillation of the pendulum, thereby increasing the sensitivity. On the other hand, if larger forces are to measured, a greater displacement of the pendulum with a relatively long oscillatory period is not required. Therefore, a lower center of mass with a relatively short oscillation period is more desirable and would provide faster readings. Accordingly, the size of the sensitivity adjustment weight 53 may be decreased, so that the center of mass will be lowered, thereby decreasing the sensitivity. Thus, by employing the simple principle of a compound pendulum and by providing simple means for changing a center of gravity of the pendulum, the present provides an uncomplicated, but highly accurate, microbalance for measuring forces varying over an extremely wide range.

For extremely small forces, the deflection of the suspension unit 11 will be extremely difficult to detect, and means must be provided for detecting the minute displacements involved. Various devices may be used, including a magnetic or electrostatic displacement sensor, but for simplicity the preferred embodiment of this invention employs visual sensory means by providing a microscope 60 which extends through the top of structure 31 to a position just above the reticle 27 on counterweight 26. The microscope 60 is provided with an objective lens 61 with a reticle 62 inscribed therein. Thus, the smallest amount of displacement of counterweight 26 will be detected by comparing the two reticles. Electrostatic charges may be manually applied to the stationary discs 16 and 17 to return the counterweight to its original null position with a corresponding return of reticle 27 in line with the reticle 62 of the microscope 60.

Figure 2:
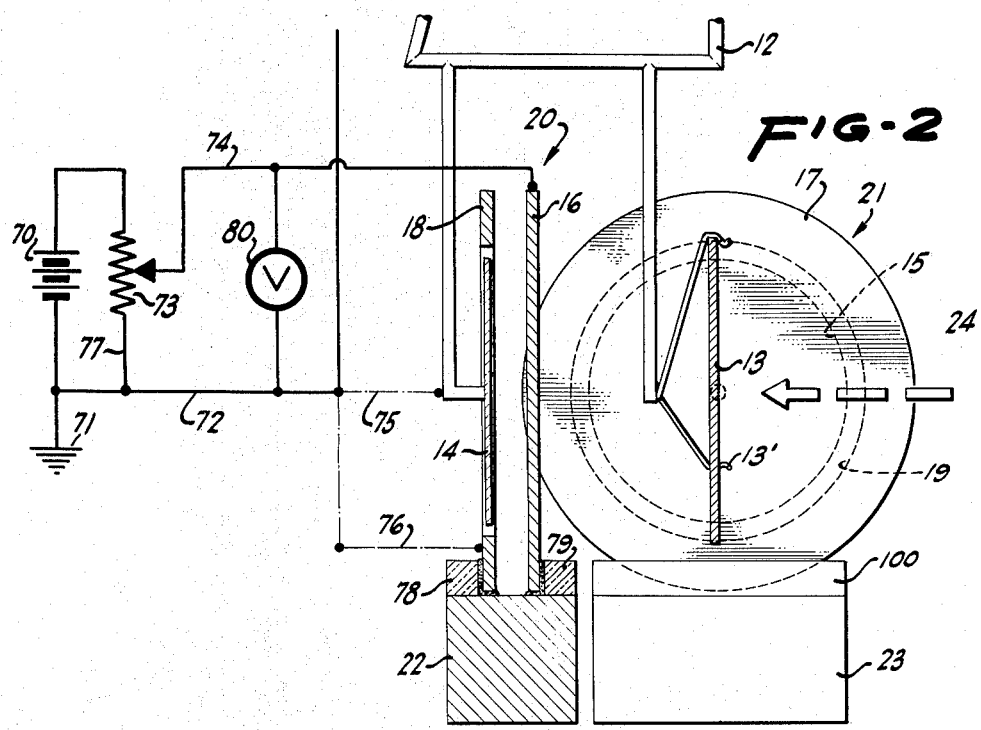
FIGURE 2 is a simplified, sectional view of the apparatus, taken in the plane 2—2 of FIGURE 1 and showing electrical circuitry associated with one of the electrostatic units.
Figure 3:
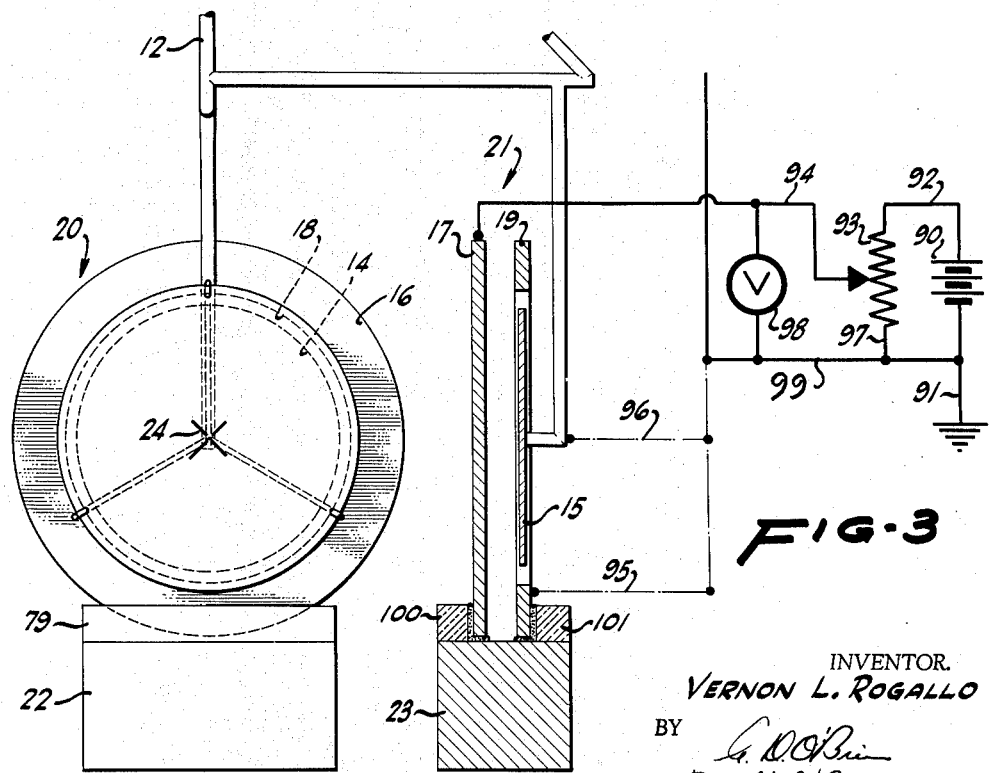
FIGURE 3 is a simplified, sectional view of the apparatus, taken in the plane 3—3 of FIGURE 1 and showing electrical circuitry associated with a second of the electrostatic units.

Referring now to FIGURES 2 and 3, there may be seen one preferred embodiment of electrostatic units and the related circuitry and electrical apparatus used for returning the pendulum back to its null position. Referring, in particular, to FIGURE 2, it will be seen that when the ion beam 24 strikes the target 13, the target 13 and the movable disc 14 will swing to the left. The total angular displacement is normally small, and, therefore, any such motion may be considered as a straight line horizontal displacement of the moving disc 14, with the face of the moving disc 14 remaining parallel to the face of the stationary disc 16. At this point, it should be noted that the movable disc 14 and the target 13 are preferably aligned with their respective axes along the same line so that their faces are parallel. For measuring extremely small forces, for example in the order of 3 micrograms, the centers of the disc and target respectively are placed within the direct line of travel of the minute force to be measured. By providing this alignment, it can be seen that any electrostatic force induced to return movable disc 14 to its original position will be equal and opposite to the force vector of the impacting ion beam. This balancing electrostatic force is supplied by a battery 70, which is capacitively connected to the moving disc 14, through a grounded lead 71 and through a lead 72, a potentiometer 73, and another lead 74, which is connected to the stationary plate 16. The moving disc 14 and ring guard 18 are connected through leads 75 and 76, respectively, to ground, as is the other end of potentiometer 73 through lead 77 to complete the rest of the circuitry. Insulation of this circuit is provided by mounting the stationary disc 16 and ring guard 18 upon two insulating supporting members 78 and 79, preferably made of quartz. For example, the discs may be fastened by cement or secured by small bolts. These supporting members are, in turn, supported by the stationary block 22, preferably made of brass, and they respectively support the stationary disc 16 and the ring guard 18 above the block 22 preventing any electrical connection therebetween. A voltmeter 80 is placed across lead 72 and lead 74 and the force of the impinging ion beam 24 may be directly read as a function of voltage. Thus, the moving disc 14 is returned to the null position by manually adjusting the potentiometer 73 until the reticles on the counterweight and eye piece are in their null point alignment.

Referred now to FIGURE 3, it will be seen that the stationary disc 17 and the movable disc function in a similar manner to the previously described members of like function. Thus, it is sufficient to note that the electrostatic balancing force is provided by a battery 90, which is grounded through lead 91 and is connected to the stationary ring 17 through lead 92, potentiometer 93, and lead 94. The balance of the circuit comprises the ring guard 19 and the movable ring 15, which are connected to ground through leads 95 and 96, respectively. The other lead 97, of potentiometer 93, is also grounded, and a voltmeter 98 is connected across leads 94 and 99, as shown. Again, the stationary disc 17 and the ring guard 19 are insulated by being mounted above the support block 23 on two support members 100 and 101, preferably made of quartz, as shown. When the ion beam strikes the target 13, as indicated by arrow 24, extending into the plane of the paper and perpendicular thereto, any component of force, which is perpendicular to the force vector, as drawn, will be detected by a displacement of the moving disc 15 and measured by returning the moving disc back to its null position by applying electrostatic forces between the moving disc 15 and the stationary disc 17. This is accomplished by manually adjusting potentiometer 93 until a null position is reached and a direct reading is obtained from voltmeter 98.

It should be noted that the drawings in FIGURES 2 and 3 indicate direct electrical connections to the moving discs 14 and 15, by the use of the phantom lines 75 and 16 in FIGURES 2 and 95 and 96 in FIGURE 3. Actually, the electrical leads 75 and 96 are connected to the angular adjustment rod 38 (FIGURE 1) which is in turn connected by the gold coating on the various collars, washers, the suspension flexure, and the framework 12, to the moving discs 14 and 15, which are maintained at the same ground potential as the entire pendulum.

It should also be noted that in measuring charged ion beams, a certain amount of current will be created because of the charge deposited on the target 13 by the impacting ion beam 24. This charge must be conducted away from the target, preferably through the structure of the pendulum so that damping of the pendulum action will not occur from wire connections made directly to the target 13. For this reason, the ground to which the above-described apparatus is connected is preferably a high-capacity ground to provide sufficient absorption of the excess charge accumulated by the target 13, and to prevent any appreciable change in the potential of moving discs 14 and 15, with respect to their respective stationary discs 16 and 17. In addition, special attention is invited to the fact that while manual operation of a relatively simple electrostatic mechanism for returning the balance to its null position is disclosed, this invention is not intended to be limited thereto. Thus, other means for accomplishing the same purpose may be employed. For example, a manual mechanism employing magnetic attraction forces may be employed, or an entirely automatic servomechanism with a balanced bridge circuit may be used to return the pendulum to the null position by relating pendulum displacement to bridge unbalance. Thus, the present invention provides a pendulum-type balance, which, by employing a fine wire flexure suspension and by employing two perpendicularly positioned capacitor plates, provides for the measurement of two force components simultaneously with equal sensitivity. For example, the sensitivity may be adjusted so that either component of force measured may be as low as from 1–3 micrograms, and the maximum probable error of forces of greater magnitude than this will be ±3 micrograms.

Figure 5:
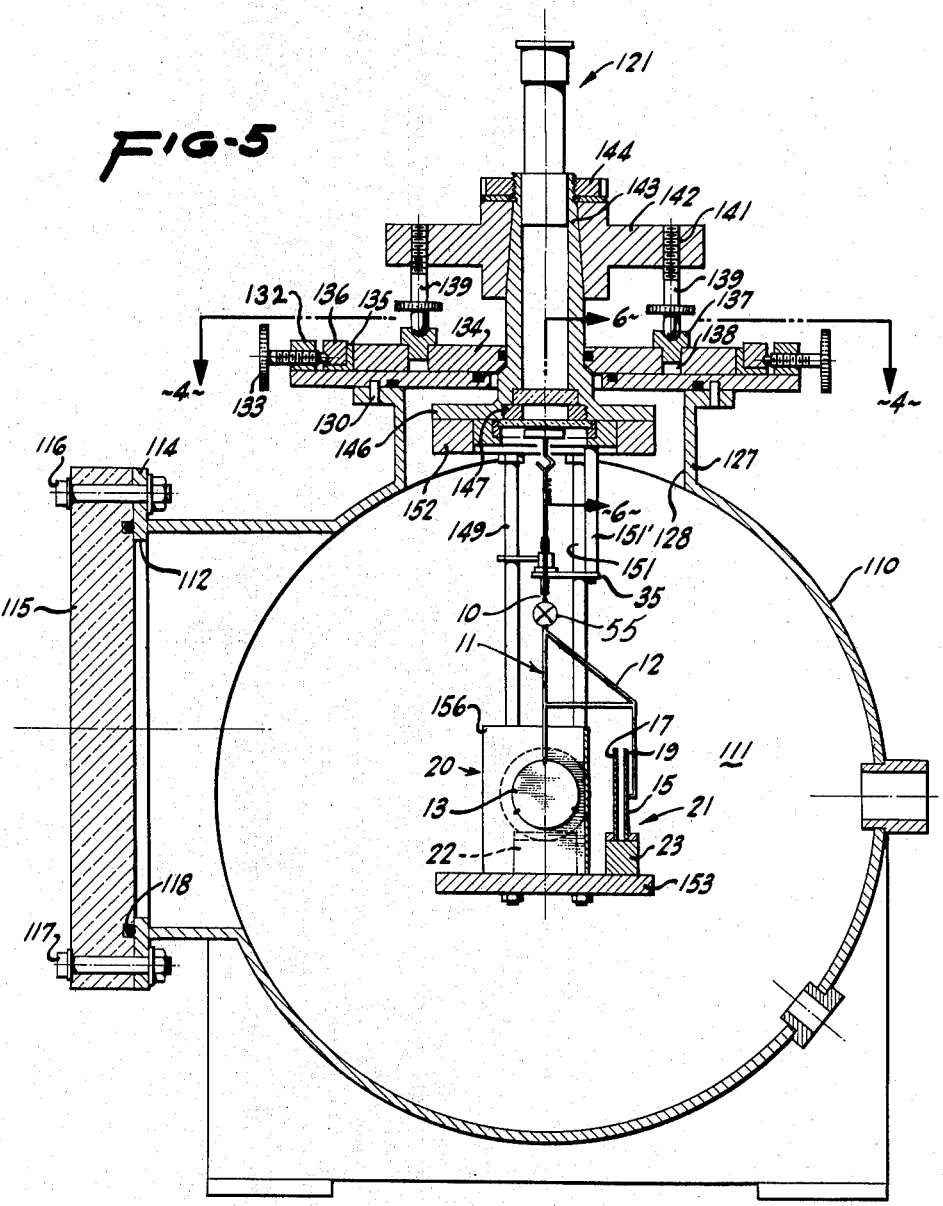
FIGURE 5 is a cross-sectional view of the housing unit, the suspension unit and the microscope embodying the principles of this invention, taken in the plane 5—5 of FIGURE 4.

Referring now to FIGURES 4, 5 and 6, and, in particular, to FIGURE 5, there may be seen a detailed illustration of a preferred embodiment of the housing and balancing apparatus of this invention. In FIGURE 5 there is shown a cross-section of the housing structure 110 defining an evacuable cavity 111, which envelops the microbalance herein and supports the optical apparatus used herewith. An unobstructed and easily accessible view is provided for viewing the microbalance in operation by providing the structure 110 with an opening 112, and a flange 114, to which a circular Lucite face plate 115 is secured by bolts 116 and 117, as shown. An annular gasket 118 is employed to provide a vacuum-tight seal when the Lucite face plate 115 is secured in place over opening 112. The microscope 121, which acts as the optical reference system for aligning the suspension unit 12, is supported by an annular flange 126, provided on a second vertical pipe 127, defining a connecting channel 128, through which the suspension unit 12 is suspended. The annular flange 126 supports an annular foundation plate 129. The foundation plate is locked against rotation by the rotational locking pins 130 extending into the flange 126. Upon the foundation plate 129 there is rigidly mounted a small block 132, which is drilled and fitted to receive thumb screws 133. Another annular plate 134, which is movable in a horizontal plane, and which may be rotated about its central vertical axis, is supported by foundation plate 129 and is circumscribed by a ring 135 with two small blocks 136 mounted thereon. The tips of set screws 133 engage these blocks 136 for moving movable plate 134 and the apparatus mounted thereon in a horizontal plane. In order to support the microscope 121 and the framework 12, which is connected to said microscope in a manner hereinafter described, four small blocks 137 are supported by the rotating plate 134 and rest in holes 138 provided in said plate, as shown. Resting upon these small blocks 137 are four threaded shafts 139. These shafts 139 extend into the threaded holes 141 of a microscope support yoke 142, as shown, and support the same along with the microscope body 143, which is threaded into the threaded top portion 144 of yoke 142.

The microscope body member 143 of microscope 121 has at its bottom end a wide flange 146, which is interiorly threaded and fitted with an annular rigid washer 147 for supporting the objective lens 148 of the microscope 121. Connected to and supported from the underside of flange 146 by bolts 149 and 151 is an annular supporting plate 152 from which the microbalance herein is suspended, as will be hereinafter described in greater detail. However, at this point, it should be noted that the microbalance is rigidly mounted on the microscope body flange 146 so that the framework 12 is rigidly connected to the microscope housing 143, which is in turn wedged into yoke 142. In this manner, there is formed one rigid, integral unit, which rigidly and securely rests upon movable plate 134, as above described. When plate 134 is moved in the horizontal plane by turning the horizontal adjustment screws 133 or rotated about a central axis by turning the plate 134, the suspension unit 12 moves accordingly, and, because of this, target 13 may be adjusted so that an ion beam 24 can be impacted at the center of target 13 and perpendicular thereto. On the other hand, by rotating the rotatable plate 134, the ion beam 24 may be directed upon the face of target 13 at any angle to provide a convenient componental analysis of the impinging ion beam.

Referring again to suspension plate 152 in FIGURE 5, it will be seen that this suspension plate provides a rigid coupling between the framework 12, the microscope 121 and the rotatable plate 134, and that by turning or horizontally sliding the rotating plate 134 all of the above-mentioned apparatus is moved the same amount. To accomplish this, the framework 12 is rigidly suspended by the insulating supporting member 35, which is connected to the elongated bolt 151'. Bolts 151 and 152 are secured into the supporting plate 152, and in turn these bolts support a flat disc-like base 153 upon which are mounted blocks 22 and 23 of the electrostatic units 20 and 21. Because of the possibility of stray capacitance between the moving discs and the target etc. an electrostatic shield 156 is provided and is rigidly mounted upon the support base 153. This shield separates the target 13 from the electrostatic units and is maintained at the same ground potential as the framework 12, target 13, and discs 14 and 15, by making appropriate electrical connections, which are not shown.

Referring now to FIGURE 6, which is an enlarged cross-section taken in plane 6—6 of FIGURE 5, there is shown in some detail the supporting plate 152 and its related apparatus. The supporting plate 152 is preferably made of Lucite to insulate the pendulum framework 12 from the rest of the apparatus. This suspension plate is rigidly bolted to the microscope body flange 146 by bolts 149 and 151, and it supports a circular, transparent plate 160. This transparent plate 160, preferably made of glass, is provided with a cross-hair reticle and is used to align the reticle on counterweight 26 when the balance is in its null position. This plate is supported upon an inner recess 161 of an annular supporting washer 162, which rests upon an inward facing flange 163 of support plate 152. Thus, when the counterweight 26 is at its null position, the reticle thereon is lined up with the reticle on the thin glass plate 160 and any misalignment between the two reticles may be adjusted by turning a plurality of adjustable set screws 164, which are recessed into holes 166, provided in the supporting ring 152.

Most of the parts above-mentioned are held in place by gravity and, in order to prevent the leakage of air into the evacuated cavity 111, annular ring gaskets 167, 168 and 169, as shown, seal the various spaces between the abutting surfaces of flange 126 and foundation plate 129, foundation plate 129 and movable plate 134, and movable plate 134 and the microscope body 143, respectively, and help maintain a vacuum within chamber 111. Thus, while the foundation plate 129 is initially held upon the flange 126 primarily by gravity, and, in the same manner, the movable plate 134 is held upon foundation plate 113 by gravity, a sufficient seal is provided to maintain the partial vacuum. As the vacuum is increased, the external atmospheric pressure tightly bears down on the adjacent support surfaces to provide a vacuum tight seal. Accordingly, the microscope body 143 of microscope 121 is sectioned with a downward expanding taper. As the rotating plate 134 is placed around the microscope body 143 and pressed down against this expanding taper, the taper will provide a tight seal against the annular vacuum seal 169.

In measuring ion beam reaction forces, or any other charged corpuscular forces, means for focusing and directing the beam onto the target 13 are employed. Accordingly, in FIGURE 7, there is shown one preferred embodiment, wherein plates are electrostatically charged to focus the ion beam. The ion beam 24 is externally formed and is directed through an opening 180 defined by a pipe 181, provided with a flange 182 for connection to the structure (not shown) which houses the beam source. The beam passes through the central openings 183 and 184 in annular focusing plates 185 and 186, which are supported by nylon insulating screws 187, 188, 189, and 190, as shown. The opening 183 and 184 are aligned with an extension of the axes thereof corresponding to a central axis of the target 13, and are connected to a source of D.C. potential of any suitable voltage for focusing beam 24 upon the center of target 13.

Considering operation of the invention in some detail, the housing structure and the balance are leveled by employing a level. The proper lateral balancing adjustment weights, as shown in FIGURE 1, are then placed upon the framework 12 until the balance itself is in a vertical, null position. Sensitivity adjustments are made by adjusting the vertical center of gravity to the desired position and the balance mounted upon the microscope is inserted into the structure 110 to rest upon support flange 126. Once the balance is at rest, the reticle on counterweight 26 is then aligned with the reticle on glass plate 160 by using the microscope 121. This adjustment is made by turning set screws 133 and moving the entire housing and framework 12 horizontally. The rotating plate 134 may then be turned to align the target 13 and the movable disc 14 with the ion beam 24 (see FIGURE 4). Upon attaining the desired alignment, the beam 24 is directed upon the target and the resulting deflection of the framework 12 is determined by returning the movable discs 14 and 15 to null position. The force vectors are then determined as a function of the voltages required to return the movable plates to original position.

It should be understood that this invention has broader aspects. It is not limited to the specific examples illustrated and described herein and the following claims are intended to cover all changes and modifications that do not depart from the true spirit and scope of this invention.

What is claimed is:

1. A microbalance comprising:
    (a) a suspension unit forming a compound pendulum;
    (b) means suspending said suspension unit for free pivoting thereof upon the application of a force thereto;
    (c) at least one target rigidly engaging said suspension unit for transmitting thereto an impinging force to be measured;
    (d) electrostatic restoring means applying a controllable force to said suspension unit for pivoting it back to null position during application of force to the target; and
    (e) means indicating a null position of the suspension unit, whereby the magnitude of said controllable restoring force required to return the suspension unit to null position is a measure of the force applied to said target.

2. A microbalance for measuring an impinging force comprising:
    (a) a suspension unit;
    (b) means supporting said suspension unit for free movement as a pendulum;
    (c) a target rigidly suspended from said suspension unit for transmitting an impinging force applied to the target to the suspension unit to pivot the unit;
    (d) at least one moving disc rigidly suspended from said suspension unit;
    (e) at least one stationary disc positioned in close proximity to said moving disc;
    (f) means for detecting displacement of said suspension unit from an original position, and
    (g) restoring means creating a restoring force between said movable and stationary discs to return said suspension unit to the original position, whereby said restoring force is a measure of the magnitude of the impinging force.

3. A device as described in claim 2, in combination with:
    (a) means defining a chamber containing said microbalance;
    (b) means for evacuating said chamber; and
    (c) means for focusing and directing an ion beam whose force is to be measured upon the target of said microbalance.

4. A microbalance employing a pendulum for measuring applied forces comprising:
    (a) a suspension unit suspended from a single point to act as a compound pendulum which swings about its pivot point when subjected to a force to be measured, said suspension unit including a structurally variegated lattice framework, a counterweight for reducing the total moment arm to be overcome by applied forces to be measured, a plurality of lateral balance adjustment weights for balancing said suspension unit in a vertical null position, and a removable sensitivity adjustment weight for varying the center of mass of said suspension unit and for adjusting the sensitivity of said device;
    (b) structure including said single pivot point for supporting said suspension unit;
    (c) electrostatic means for returning said suspension unit to an original null position and producing an indication related to the magnitude of applied forces to be measured; and (d) aligning means for indicating the null position of said suspension unit.

5. A microbalance capable of measuring at least two components of applied force comprising:
  (a) a wire flexure;
  (b) means for supporting said wire flexure;
  (c) a suspension unit entirely supported by said flexure with said suspension unit being free to swing about the connecting point between said flexure and said means for supporting said flexure;
  (d) a plurality of discs rigidly mounted upon said movable suspension unit;
  (e) a target rigidly mounted upon said movable suspension unit for receiving forces to be measured;
  (f) a plurality of stationary discs positioned in close proximity to said movable discs;
  (g) a plurality of means for applying electrostatic forces between said stationary discs and said movable discs for returning said movable discs to an original null position by balancing the applied force to be measured; and
  (h) means indicating the magnitudes of said electrostatic forces required to return said movable discs to null position as a measure of applied forces.

6. A null-type microbalance employing compound pendulum action comprising:
  (a) a structurally variegated, lattice framework forming the framework of a pendulum;
  (b) a finely drawn suspension flexure individually supporting said framework to provide substantially frictionless pivoting action to the pendulum;
  (c) means for supporting said suspension flexure;
  (d) a target rigidly suspended from said lattice framework for receiving the force to be measured;
  (e) a first movable disc which is supported from said lattice framework with the central axis of said disc being in line with the central axis of said target;
  (f) a second movable disc, also rigidly supported by said lattice framework with the central axis of said disc being perpendicular to the central axis of said first movable disc and to the central axis of said target;
  (g) a first stationary disc positioned in close proximity to said first movable disc;
  (h) a second stationary disc positioned in close proximity to said second movable disc;
  (i) separate, variable force inducing means for inducing electrostatic forces between said first and second stationary discs and said first and second movable discs, respectively;
  (j) a counterweight provided with a reticle and positioned at the opposite end of said lattice framework from said movable discs and target; and
  (k) an eye piece rigidly mounted and positioned in relation to said counterweight for detecting minute displacements thereof for determining location of the said framework and engaging elements at a normal position without forces applied thereto, whereby the magnitude of electrostatic forces required to return the framework to normal position is a measure of forces applied to said target.

7. A microbalance employing a pendulum for measuring applied forces comprising:
  (a) a suspension unit suspended from a single point to act as a pendulum which swings about its pivot point when subjected to a force to be measured;
  (b) structure including said single pivot point for supporting said suspension unit;
  (c) means for returning said suspension unit to an original null position and producing an indication related to the magnitude of applied forces to be measured;
  (d) aligning means for indicating the null position of said suspension unit;
  (e) said suspension unit comprising—
    (1) a structurally variegated lattice frame work,
    (2) a counterweight for reducing the total moment arm to be overcome by applied forces to be measured,
    (3) a plurality of lateral balance adjustment weights for balancing said suspension unit in a vertical null position, and
    (4) a removable and replaceable sensitivity adjustment weight for varying the center of mass of said suspension unit and for adjusting the sensitivity of said device.

8. A balance capable of measuring two components of an applied force comprising:
  (a) a suspension unit forming a compound pendulum;
  (b) means suspending said suspension unit for free pivoting thereof upon the application of a force;
  (c) said suspension unit including a target on which said force is directed;
  (d) means for applying a storing force to said suspension unit along one of two coordinate axes;
  (e) means for applying a restoring force to said suspension unit along the other coordinate axis so as to null the suspension unit with respect to both of the coordinate axes, said restoring forces being a measure of said components of applied force, respectively.

9. A balance capable of measuring two components of an applied force comprising:
  (a) a suspension unit;
  (b) means for suspending said suspension unit for pivoting thereof as a compound pendulum upon the application of a force to be measured;
  (c) said suspension unit including a target on which said force is directed;
  (d) first and second discs attached to said suspension unit;
  (e) third and fourth discs positioned in close proximity to said first and second discs, respectively;
  (f) means for detecting displacement of said suspension unit from the position occupied prior to the application of said force; and
  (g) means creating a restoring force between said first and third discs and means creating a restoring force between said second and fourth discs to return said suspension unit to the former position whereby said restoring forces are a measure of two components of said applied force.

10. A microbalance for measuring two components of applied force of an ion beam comprising:
  (a) a suspension unit suspended from a single pivot to act as a compound pendulum which swings about its pivot point when subjected to a force to be measured;
  (b) structure including said single pivot point for supporting said suspension unit;
  (c) said suspension unit comprising—
    (1) a lattice framework,
    (2) a counterweight for reducing the total moment arm to be overcome by applied forces to be measured,
    (3) a plurality of lateral balance adjustment weights for balancing said suspension unit in a vertical null position, and
    (4) a removable and replaceable sensitivity adjustment weight for varying the center of mass of said suspension unit and for adjusting the sensitivity of said device;
  (d) first and second discs attached to said suspension unit;
  (e) third and fourth discs positioned in close proximity to said first and second discs, respectively;
  (f) means for detecting displacement of said suspension unit from the position occupied prior to the application of said force; and (g) means creating a restoring force between said first and third discs and means creating a restoring force between said second and fourth discs to return said suspension unit to the former position whereby said restoring forces are a measure of two components of said applied force.

11. A balance capable of measuring an applied force comprising:
(a) a suspension unit;
(b) said suspension unit comprising—
  (1) a framework,
  (2) a target attached to said framework on which said force to be measured is directed,
  (3) a disc positioned on said framework,
  (4) means for varying the center of gravity of said said suspension unit;
(c) means for suspending said suspension unit for pivoting thereof as a compound pendulum upon the application of a force to be measured;
(d) a stationary disc positioned in close proximity to said framework disc;
(e) means for detecting displacement of said suspension unit from the position occupied prior to the application of said force; and
(f) means creating a restoring force between said framework disc and stationary disc to return said suspension unit to the former position, whereby said restoring force is a measure of the magnitude of the applied force.

References Cited by the Examiner

UNITED STATES PATENTS

| | | | |
|---|---|---|---|
| 1,927,150 | 9/1933 | Berroth | 73—383 |
| 2,185,582 | 1/1940 | Blau | 73—383 |
| 2,316,915 | 4/1943 | Truman | 73—382 |
| 2,769,337 | 11/1956 | Rich | 73—228 X |
| 2,842,351 | 7/1958 | Rodder | 73—382 X |
| 2,968,952 | 1/1961 | Stalder | 73—517 |
| 3,023,626 | 3/1962 | Bonnell | 73—517 |
| 3,077,783 | 2/1963 | Stiles et al. | 73—517 |

OTHER REFERENCES

Article entitled "Critical Review of Bristle Flowmeter Techniques," by G. A. Brecher, from IRE Transaction on Medical Electronics, December 1959, pages 294–304; classified in 73/228.

RICHARD C. QUEISSER, *Primary Examiner.*

JOSEPH P. STRIZAK, *Examiner.*

C. A. RUEHL, *Assistant Examiner.*